Jan. 27, 1931. C. V. McCARLEY 1,790,277
CALIPER
Filed June 26, 1929
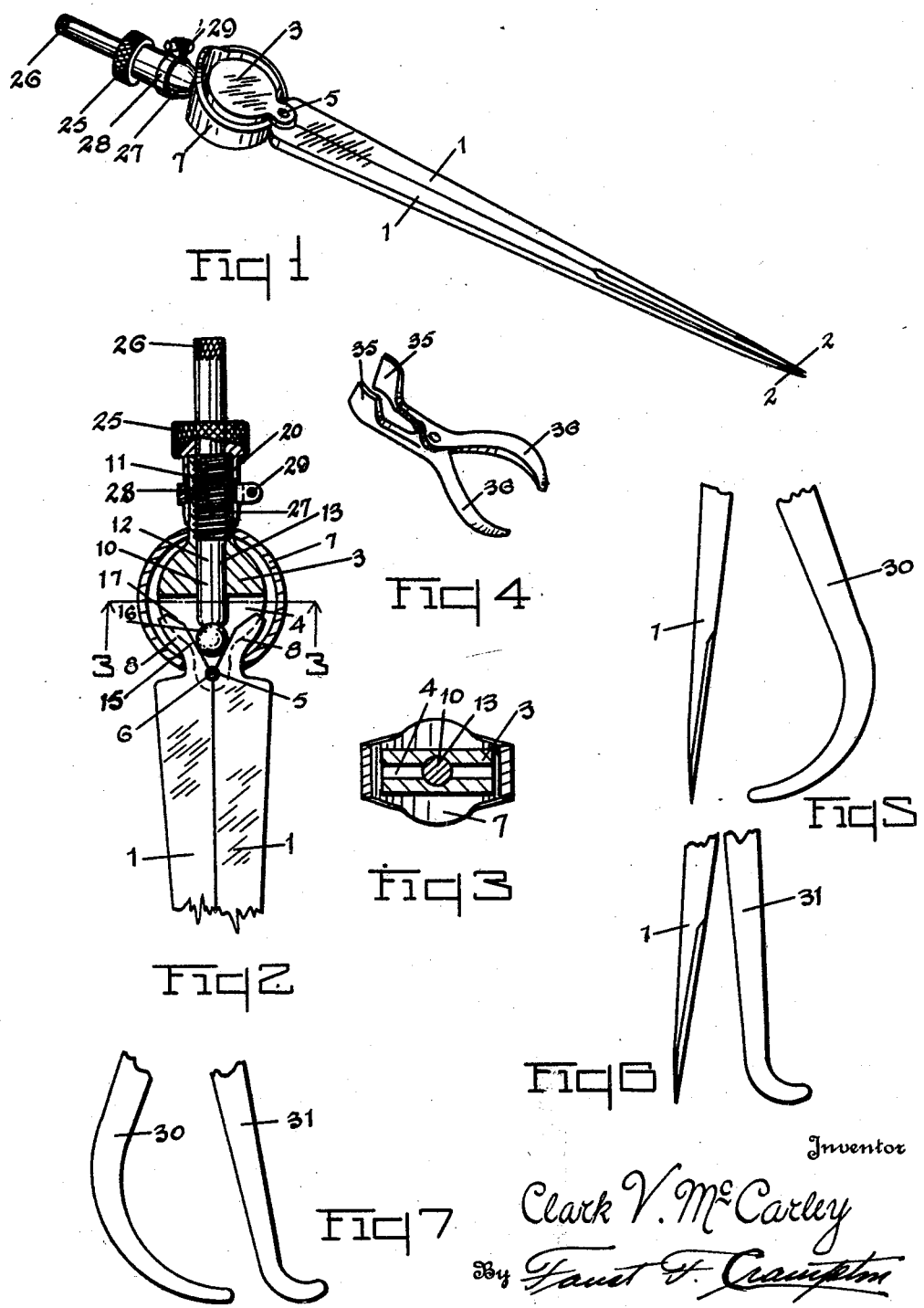

Patented Jan. 27, 1931

1,790,277

UNITED STATES PATENT OFFICE

CLARK V. McCARLEY, OF TOLEDO, OHIO

CALIPER

Application filed June 26, 1929. Serial No. 373,699.

My invention has for its object to provide an efficient measuring tool wherein distances between two points are measured or determined. The invention particularly relates to such tools as compasses and calipers and it particularly provides a simple means for adjusting the points of such tools. It also provides a construction wherein the legs may be readily replaced to change the character of the tool, as from a compass to an inside or outside caliper, or to a hermophrodite caliper.

The invention may be contained in tools of different forms and usable for different purposes and, to illustrate a practical application of the invention, I have selected a structure containing the invention as an example of the various embodiments of my invention, and shall describe it hereinafter. The structure selected is shown in the accompanying drawings.

Fig. 1 is a perspective view of the measuring tool selected as an example of the various constructions that contain my invention. Fig. 2 is a longitudinal section of the head of the tool. Fig. 3 is a transverse section taken on the plane of the line 3—3 indicated in Fig. 2. Fig. 4 illustrates a tool that may be used for opening the spring to provide for replacement of the legs. Figs. 5, 6, and 7, illustrate the various forms of legs that may be inserted in the instrument, shown in Fig. 1, for converting the compass into a caliper for inside or outside measurement, or for hermophroditing.

The tool is provided with a pair of removable legs 1 having determining points, such as the points 2. The legs are pivotally connected to a head 3. The head 3 is provided with a slot 4 in which the ends of the legs move. The width of the slot 4 is, preferably, substantially the same as the thickness of the metal of the ends of the legs whereby the head prevents any lateral play of the legs. A pin 5 extends through the head 3 and transversely relative to the slot 4. The legs 1 are provided with notches 6 that fit the opposite sides of the pin 5. A spring band 7 surrounds the head 3 and engages the legs 1 at points located intermediate the center of the pin 5 and the ends of the legs that extend into the slot 4.

The ends of the legs are, preferably, made in the form of fingers 8 that are inclined to the longitudinal axes of the legs and the notches 6 have a total arcuate length that is less than 360 degrees which permits the angular movement of the legs 1 about the axis of the pin 5. The spring band 7 elastically tends to move the fingers so that their longitudinal axes approach parallelism and thus tends to open or separate the legs 1. The legs may thus be adjusted relative to each other by limiting the movement induced by the operation of the spring 7 on the legs 1.

To adjustably locate the legs and, consequently the points 2 of the legs relative to each other, a suitable member is adjustably positioned in the head 3 and located intermediate the fingers 8. In the form of construction shown, a threaded pin 10 extends through a neck or a sleeve part 11 of the head 3 which is threaded to receive the threaded pin. The end 12 of the pin 10 is cylindrical and fits a bored part 13 of the head. The pin 10 may be rotated to adjust the lower end of the cylindrical part of the pin to vary the angle between the fingers 8 and, consequently, to vary the angle between the legs 1. The bore of the head 3 has a diameter that is larger than the slot 4 and consequently the head securely maintains the cylindrical part 12 of the pin 10 in alignment notwithstanding the pressure of the fingers 8 which is produced by the operation of the spring 7.

In order to reduce friction and to maintain a single point engagement along the fingers 8 to secure uniform movement of the legs 1, in each unit of length of movement of the pin 10, the inner edges 15 of the fingers 8 may be sligthly curved and a ball 16 may be located in the bore 13 so as to engage the edges 15 of the fingers 8. The ball 16 has a diameter substantially the same as that of the bore 13 and, consequently, its center will be maintained in the axis of the pin 10.

When the ball 16 is forced from between the edges 15 of the fingers 8 by the wedging action of the fingers induced by the operation of the spring 7, the ball will be located between the edges 17 of the fingers 8. When the edges 15 of the fingers 8 are in contact with each other, the edges 17 are inclined relative to each other which enables the ball to spread the fingers to open them. If desired, the edges 15 and 17 may be united to form a continuous curved edge.

The pin 10 is, preferably, provided with a skirt 20 that surrounds the threaded sleeve 11 of the head and an indicating scale may be located on the exterior surface of the sleeve 11 to indicate the relative location or separation of the points 2 of the legs 1. The pin is provided with two knurled parts of different diameters, such as the parts 25 and 26, whereby the pin may be slowly or rapidly rotated to obtain the adjustment desired by rolling the pin 10 between the fingers of the user of the instrument. A rapid movement of the part 26 will be caused by rolling the part between the fingers, while the more slow movement will be produced by rolling the part 25 between the fingers. The adjustment of the points 2 can be more accurately made by operating on the part 25 of the pin 10. Preferably, the skirt 20 of the pin 10 is slotted as at 27, and a clamping ring 28 is located on the outside of the skirt 20 to clamp the skirt 20 against the surface of the sleeve part 11 of the head. The ring 28 is a split ring and may be provided with the screw 29 for clamping the skirt 20 and, consequently, securing the pin 10 in any position to which it may be adjustably moved by the operation of the pin 10.

Preferably, the sleeve part 11 extends through an opening formed in the spring which operates to maintain the spring in position relative to the other parts. Inasmuch as the legs 1 are connected only by the notches that engage the pin 5, and by the parts of the edges of the legs that are engaged by the ends of the springs, the legs 1 are readily removable from the instrument. They may be easily removed and inserted in position by merely spreading the spring. Thus, the tool may be readily converted to any form of measuring or determining tool of the same general character, that is, it may be used for calipers or as a compass and provides a convenient tool having parts so constructed that they may be readily replaced to form tools to be used for a variety of purposes. In constructions heretofore used, the legs of such tools have interconnected parts that are usually riveted to and without mutilation the legs cannot be removed from the tool and, consequently, a mechanic requires as many complete tools as there are purposes for which he wishes to use such tools. In the form of construction shown, and because of the replaceability of its legs, a compass point 1 may be used in conjunction with an outside caliper leg 30 or a compass leg 1 may be used in conjunction with an inside caliper leg 31.

If desired, a combination of an outside caliper leg 30 may be used in conjunction with an inside caliper leg 31. Thus, provision is made for transforming the tool from a compass into an outside caliper or an inside caliper, or to a hermaphrodite caliper.

For convenience of spreading the ends of the spring band 7 to enable replacement of the legs, any suitable means may be used. In Fig. 4 is shown the spreader made in the form of nippers having prongs 35 that may be inserted within the spring 7 and spread by squeezing together the parts 36 that form the handle of the tool. This will spread the ends of the spring and permit removal and replacement

I claim:—

1. In a measuring tool, a head member having a slot and a neck, the said head having an opening extending through the neck and to the slot, a pin extending through the head and across the slot, a pair of legs having notches for engaging the pin on opposite sides thereof, a bow spring for engaging the legs to press the legs against the said pin and cooperating with the said pin for pivotally and elastically connecting the legs to the head, the legs having protruding parts located within the slot of the head, and means located within the neck for adjusting the angular position of the legs relative to each other.

2. In a measuring tool, a head member having a slot and a neck, the said head having an opening extending through the neck and to the slot, a pin extending through the head and across the slot, a pair of legs having notches for engaging the pin on opposite sides thereof, a bow spring for engaging the legs to press the legs against the said pin and cooperating with the said pin for pivotally and elastically connecting the legs to the head, the legs having protruding parts located within the slot of the head, the spring having an opening and the neck of the head protruding through the opening of the spring, a ball carrying member located in the neck, a ball located on the ball carrying member and adapted to engage between the protruding parts of the legs located in the slots, whereby movement of the member in the neck will vary the location of the points of the legs relative to each other.

In witness whereof I have hereunto signed my name to this specification.

CLARK V. McCARLEY.